United States Patent
Meagher (10) Patent No.: US 8,199,448 B2
(45) Date of Patent: Jun. 12, 2012

(54) METHOD AND APPARATUS FOR PROTECTING AGAINST REVERSE CURRENT FLOW

(75) Inventor: Thomas Bruce Meagher, Houston, TX (US)

(73) Assignee: Rockwell Automation Limited, Maldon, Essex (GB)

( * ) Notice: Subject to any disclaimer, the term of this patent is extended or adjusted under 35 U.S.C. 154(b) by 502 days.

(21) Appl. No.: 12/360,225

(22) Filed: Jan. 27, 2009

(65) Prior Publication Data

US 2009/0195952 A1 Aug. 6, 2009

Related U.S. Application Data

(60) Provisional application No. 61/025,917, filed on Feb. 4, 2008.

(30) Foreign Application Priority Data

Sep. 26, 2008 (EP) ..................................... 08165291

(51) Int. Cl.
*H02H 3/18* (2006.01)

(52) U.S. Cl. ......................................................... 361/84
(58) Field of Classification Search ................... 361/84; 324/769, 762.09
See application file for complete search history.

(56) References Cited

U.S. PATENT DOCUMENTS

| | | | | |
|---|---|---|---|---|
| 5,654,859 | A * | 8/1997 | Shi .................................. | 361/66 |
| 7,830,120 | B2 * | 11/2010 | Ibrahim ......................... | 320/134 |
| 2008/0197914 | A1 * | 8/2008 | Shimizu et al. ............... | 327/541 |

* cited by examiner

*Primary Examiner* — Rexford N Barnie
*Assistant Examiner* — Angela Brooks
(74) *Attorney, Agent, or Firm* — Boyle Fredrickson, S.C.; William R. Walburn; John M. Miller (57) ABSTRACT

A system for protecting against reverse current flow in an output module of an Industrial Process Control System includes a transistor that is driven by a control signal and a current monitor arranged to monitor a current through the transistor. The system includes a processor that is arranged to receive the monitored current and to generate the control signal in dependence upon the monitored current. The processor is configured to turn off the transistor if a reverse current is detected in the transistor. Extension of the system provides a power feed combiner that is protected against reverse current flow.

17 Claims, 7 Drawing Sheets

METHOD AND APPARATUS FOR PROTECTING AGAINST REVERSE CURRENT FLOW

CROSS REFERENCE TO RELATED APPLICATIONS

This application claims priority to U.S. Provisional Application Ser. No. 61/025,917 filed on Feb. 4, 2008 and European Patent Application No. EP08165291 filed on Sep. 26, 2008, the disclosures of which are expressly incorporated herein.

BACKGROUND a. Field of the Invention

This invention relates to protection against reverse current flow in an output module for an Industrial Process Control System in particular for an Industrial Process Control System Suitable for exemplary systems such as:
Emergency Shutdown systems;
Critical process control systems;
Fire and Gas detection and protection systems;
Rotating machinery control systems;
Burner management systems;
Boiler and furnace control systems; and
Distributed monitory and control systems.

Such control systems are applicable to many industries including oil and gas production and refining, chemical production and processing, power generation, paper and textile mills and sewage treatment plants.

b. Related Art

In industrial process control systems, fault tolerance is of utmost importance. Fault tolerance is the ability to continue functioning safely in the event of one or more failures within the system.

Fault tolerance may be achieved by a number of different techniques, each with its specific advantages and disadvantages.

An example of a system which provides redundancy is a Triple Modular Redundancy (TMR) system. Using TMR, critical circuits are triplicated and perform identical functions simultaneously and independently. The data output from each of the three circuits is voted in a majority-voting circuit, before affecting the system's outputs. If one of the triplicated circuits fails, its data output is ignored. However, the system continues to output to the process the value (voltage, current level, or discrete output state) that agrees with the majority of the functional circuits. TMR provides continuous, predictable operation.

However, TMR systems are expensive to implement if full TMR is not actually a requirement, and it is desirable to utilise an architecture which provides flexibility so that differing levels of fault tolerance can be provided depending upon specified system requirements.

Another approach to fault tolerance is the use of hot-standby modules. This approach provides a level of fault tolerance whereby the standby module maintains system operation in the event of module failure. With this approach there may be some disruption to system operation during the changeover period if the modules are not themselves fault-tolerant.

Fault tolerant systems ideally create a Fault Containment Region (FCR) to ensure that a fault within the FCR boundary does not propagate to the remainder of the system. This enables multiple faults to co-exist on different parts of a system without affecting operation.

Fault tolerant systems generally employ dedicated hardware and software test and diagnostic regimes that provide very fast fault recognition and response times to improve the reliability of such systems.

Safety control systems are generally designed to be 'fail-operational/fail-safe'. Fail operational means that when a failure occurs, the system continues to operate: it is in a fail-operational state. The system should continue to operate in this state until the failed module is replaced and the system is returned to a fully operational state.

An example of fail safe operation occurs, for example if, in a TMR system, a failed module is not replaced before a second failure in a parallel circuit occurs, the second failure should cause the TMR system to shut down to a fail-safe state. It is worth noting that a TMR system can still be considered safe, even if the second failure is not failsafe, as long as the first fault is detected and announced, and is itself failsafe.

It is desirable if output channels and their loads are protected from reverse currents flowing back into the output channel with minimal power loss. This would allow external sources to apply power to the loads without the risk of the output module interfering with the load, or the external source interfering with the digital output module.

It is also desirable to provide a power feed combiner that provides the following benefits:
Low loss.
Power feed reverse current shutdown.
Testability.
Over-temperature fault protection.

Conventionally a simple power diode may be used to block reverse currents, and two simple power diodes may be used to commonly "OR" two power feeds and to prevent reverse current in one or other of the feeds.

However, the heat generated by such diodes is excessive, preventing the use of such simple techniques in a system module for the present application.

Therefore, there is a need for a system of protecting against reverse current flow that is both economical, can withstand the electrical conditions commonly associated with the loads of Industrial Process Control Systems, and that is easy to implement.

SUMMARY OF THE INVENTION

According to the invention there is provided a reverse blocking circuit for blocking reverse current. The reverse blocking circuit includes a first transistor that is driven by a first control signal and a first current monitor that is arranged to monitor a first current through the first transistor. A processor is arranged to receive the first monitored current and is arranged in operation to generate the first control signal in dependence upon the first monitored current. The processor is also arranged to turn off the first transistor in the event a reverse current is detected in the first transistor.

According to another aspect of the invention there is provided a power feed combiner that includes a first transistor driven by a first control signal; a first current-monitor arranged to monitor a first current through the first transistor; a second transistor driven by a second control signal; and a second current monitor that is arranged to monitor a second current through the second transistor. In operation, the first transistor receives a first field voltage and the second transistor receives a second field voltage. The sources of voltage to the first and second transistor are connected to provide a combined field voltage when both the first transistor and the second transistor are turned on. The processor is arranged to receive the first monitored current and the second monitored current. In operation, the processor is arranged to generate the first control signal in dependence upon the first monitored current; generate the second control signal in dependence on the second monitored current. The processor is further configured to turn off the first transistor if a reverse current is detected in the first transistor and to turn off the second transistor if a reverse current is detected in the second transistor.

BRIEF DESCRIPTION OF THE DRAWINGS

Embodiments of the invention will now be described, by way of example only, with reference to the accompanying drawings, in which.

DETAILED DESCRIPTION

Figure 1:
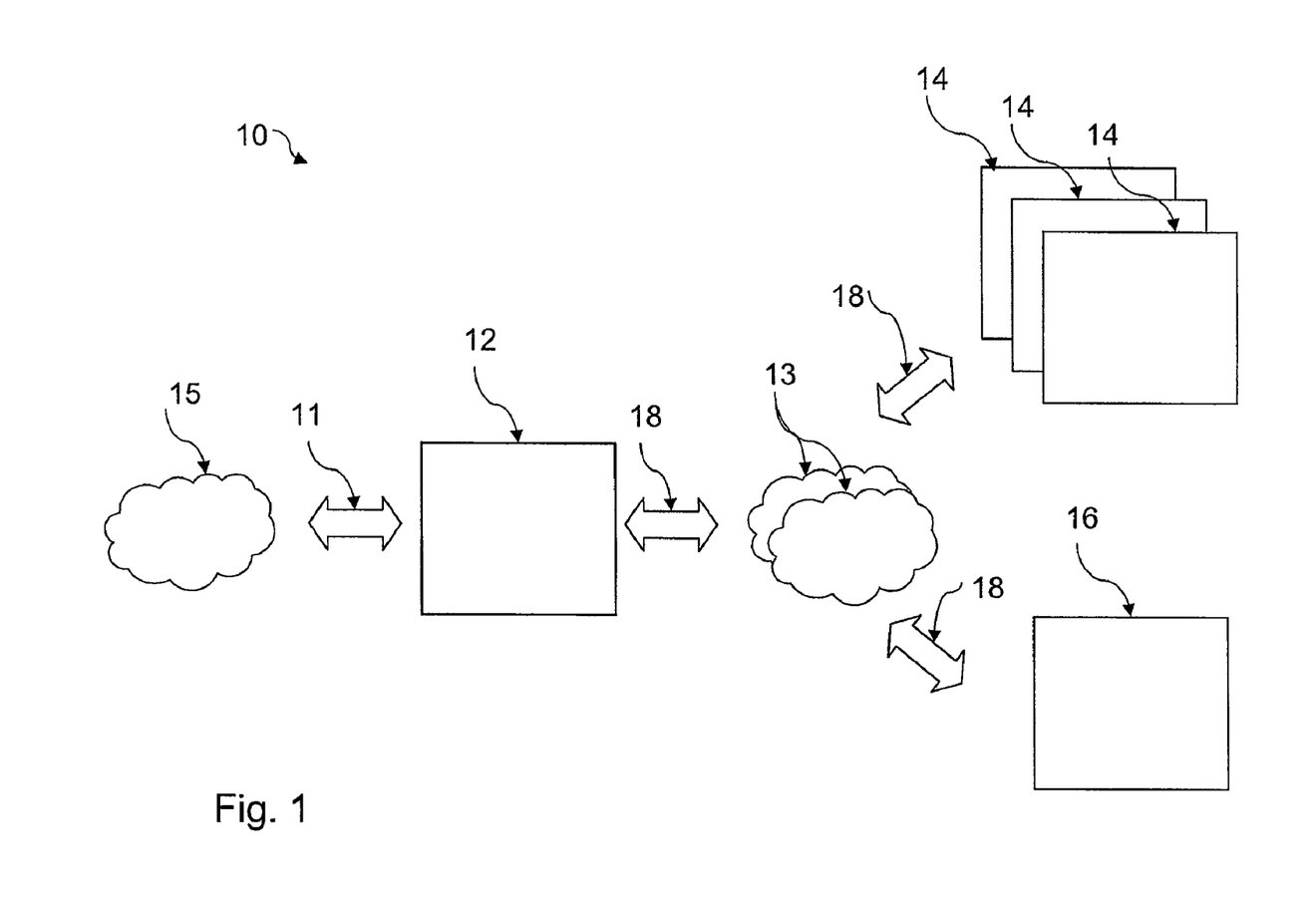
FIG. 1 is an illustration showing the architecture of a distributed industrial process control system which uses the apparatus and method of the present invention.

In the Industrial Process Control System shown in FIG. 1, a distributed architecture is designed to be used in different Safety Level Integrity (SIL) environments, so that if a high SIL is required it can be provided, but if a low SIL is all that is needed the system can be reduced in complexity in order to reduce unnecessary extra costs.

An exemplary Industrial Process Control System 10, comprises a workstation 12 one or more controllers 14 and a gateway 16. The workstation 12 communicates with the controllers 14 and the gateway 16 via Ethernet connections 18 to one or more control networks 13. Multiple Ethernet connections 18 provide redundancy to improve fault tolerance. The workstation 12 may be connected via a conventional Ethernet connection 11 to another external network 15.

A controller 14 will now be described in more detail with reference to FIGS. 2 and 3.

Figures 2, 3:
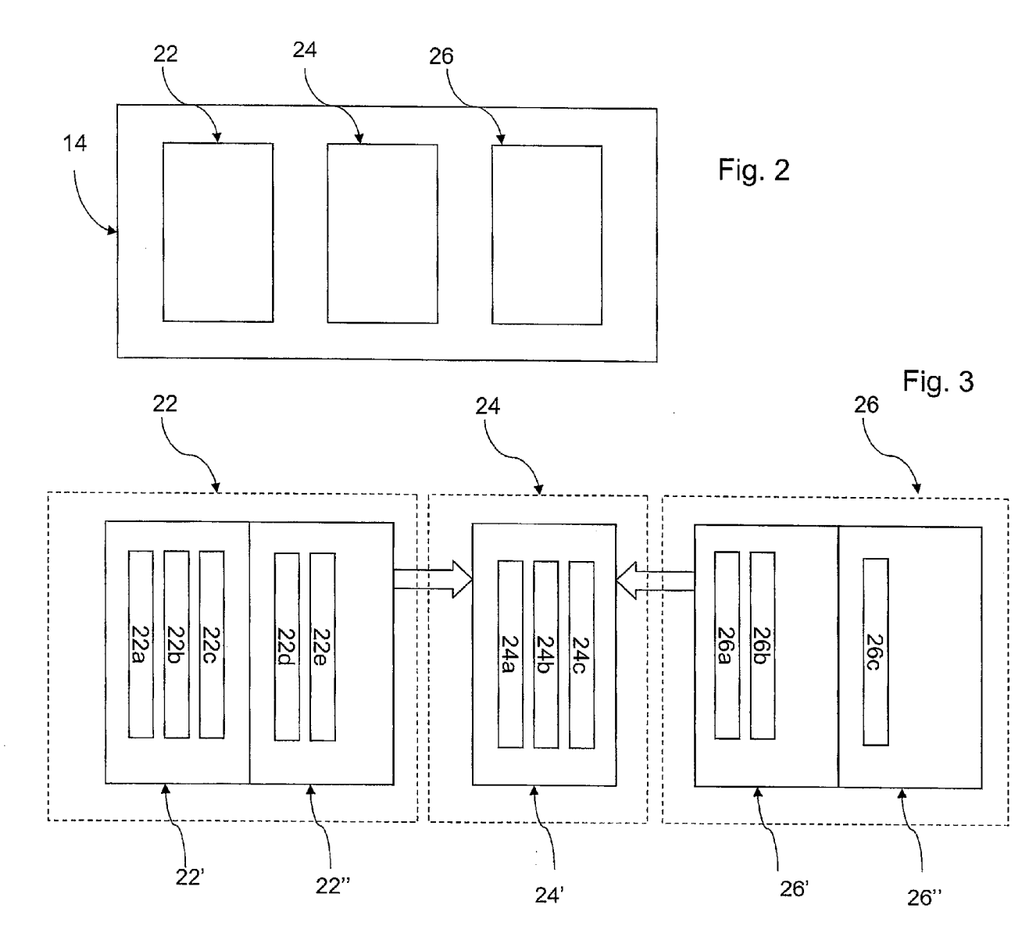
FIG. 2 illustrates schematically a controller of the industrial process control system illustrated in FIG. 1.
FIG. 3 illustrates a possible configuration of a controller.

FIG. 2 illustrates a schematic diagram of the controller 14 comprising an input assembly 22, a processor assembly 24 and an output assembly 26. In this schematic illustration the input assembly 24 and output assembly 26 are on different backplanes but they may equally well share a single backplane.

Assemblies 22, 24, 26 are created from one or more communications backplane portions which have three slots to accommodate up to three modules together with termination assemblies which have one two or three slots, and which interface to field sensors and transducers. A termination assembly may straddle two contiguous backplane portions. A module comprises a plug in card with multiple connectors for plugging onto a communications backplane and a termination assembly.

It will be appreciated that having three slots in a communications backplane portion is one design option and other design options with greater (or fewer) slots are possible without departing from the scope of the invention as defined in the appended claims.

FIG. 3 illustrates a possible physical configuration of the controller 14. In this embodiment of the invention, the input assembly 22, output assembly 26 and processor assembly 24 are physically separated from one another by grouping the modules of different types onto separate I/O communications backplanes.

In the example shown, the input assembly 22 comprises two communications backplane portions, 22', 22". The first backplane portion 22' has a triplex input termination assembly and three input modules 22a, 22b, 22c, the second backplane portion 22" has a duplex input termination assembly 22" and two input modules 22c, 22d. The processor assembly 24 comprises a single processor backplane portion 24' having three processor modules 24a, 24b and 24c. The output assembly 26 comprises two backplane portions 26', 26". The first backplane portion 26' has a duplex output termination assembly with two output modules 26a, 26b and the second backplane portion 26" has a simplex output termination assembly with a single output module 26c.

Figure 4:
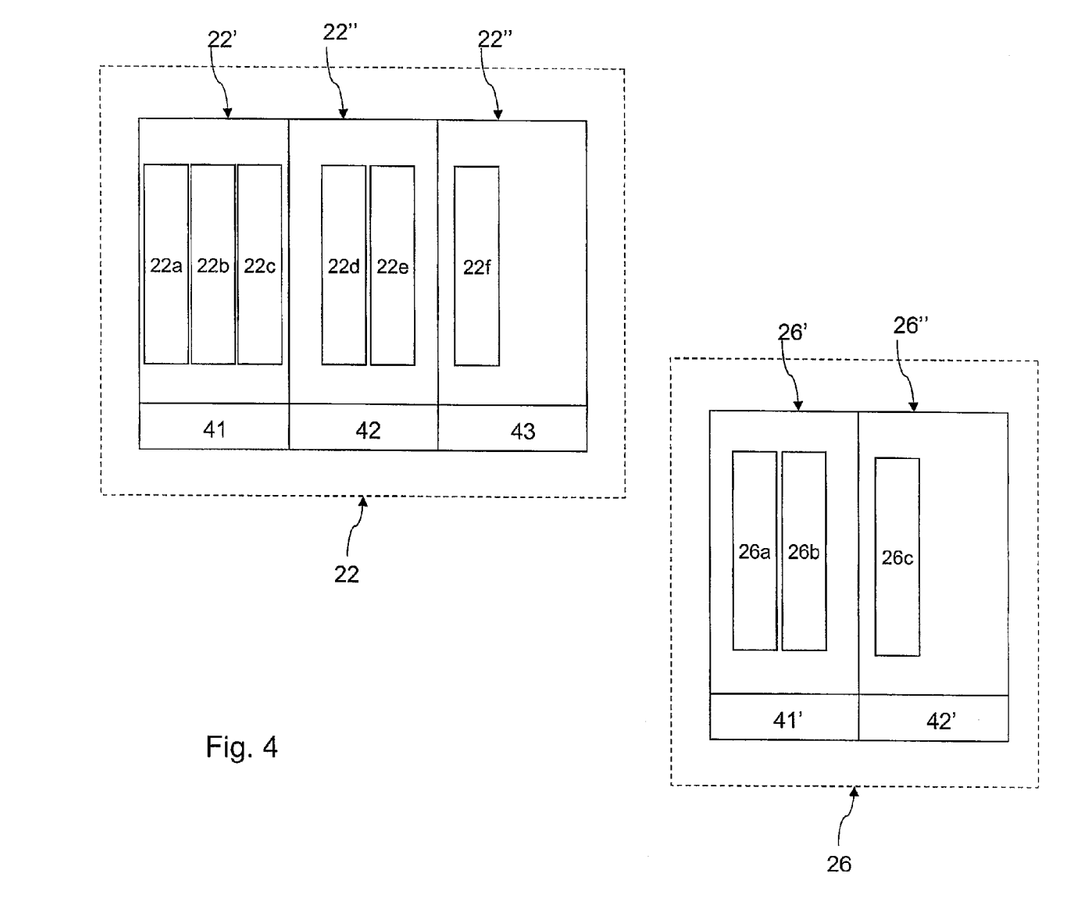
FIG. 4 shows various options for an input assembly and output assembly of the controller shown in FIG. 3.

The flexibility of the input assembly 22, will now be described, in more detail with reference to FIG. 4.

An input assembly 22 comprises one or more backplane portions and termination assemblies 22' 22" 22'" etc. For example, a triplex portion 22' having three modules 22a, 22b, 22c might be used for high availability requirement, a duplex portion 22" having two modules 22d, 22e might be provided for fault tolerant applications and a simplex portion 22'" with a single modules 22f might be provided for failsafe applications. The termination assemblies may be provided with different types of field conditioning circuits. For example assembly 22' may be provided with a 24V DC field conditioning circuit 41 assembly 22" may be provided with a 120V DC field conditioning circuit 42 and assembly 22'" may be provided with a 4-20 mA field conditioning circuit 43. Similarly possible configurations are shown for an output assembly 26. It will be appreciated that numerous configurations of backplane portions and termination assemblies with various different numbers of modules and various different types of field conditioning circuits are possible and the invention is not limited to those shown in these examples.

Where an assembly provides more than one module for redundancy purposes it is possible to replace a failed module with a replacement module whilst the industrial process control system is operational which is also referred to herein as online replacement (ie replacement is possible without having to perform a system shutdown). Online replacement is not possible for a simplex assembly without interruption to the process. In this case various "hold last state" strategies may be acceptable or a sensor signal may also be routed to a different module somewhere else in the system.

The processor assembly configures a replacement processor module using data from a parallel module before the replacement module becomes active.

The field conditioning circuits 41, 42, 43 transform a signal received from a sensor monitoring industrial process control equipment to a desired voltage range, and distribute the signal to the input modules as required. Each field conditioning circuit 41, 42, 43 is also connected to field power and field return (or ground) which may be independently isolated on a channel by channel basis from all other grounds, depending on the configuration of the input termination assembly. Independent channel isolation is the preferred configuration because it is the most flexible. The field conditioning circuits 41, 42, 43 comprise simple non active parts and are not online replaceable.

Figures 5, 6:
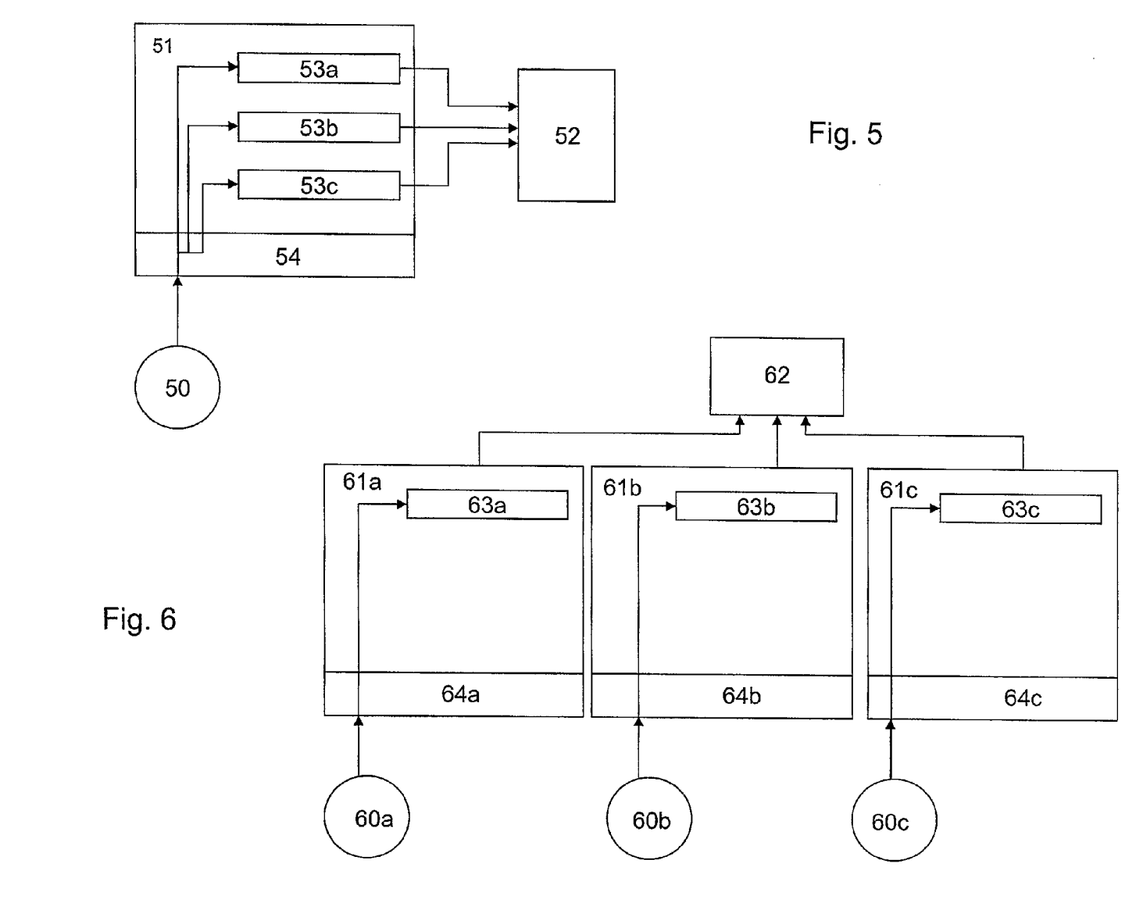
FIG. 5 shows one possible configuration of an input assembly implementing a two out of three voting strategy.
FIG. 6 illustrates a second possible configuration of an input assembly for a two out of three voting strategy.

FIG. 5 and FIG. 6 illustrate the flexibility of the architecture described herein showing different configurations for a triplex system for generating a signal with a high availability requirement. Referring to FIG. 5, a three module input assembly 51 receives a signal from a sensor 50 via a field conditioning circuit in termination assembly 54. The field conditioning circuit 54 transforms the signal to a desired voltage range and distributes the signal to three replicated input modules 53a, 53b, 53c. Each input module processes the signal and the results are sent to a two out of three voter 52 to generate a result signal in dependence thereon.

Referring to FIG. 6, replicated sensors 60a, 60b, 60c each send a signal to a respective simplex assemblies 61a, 61b, 61c via respective field conditioning circuits in termination assemblies 64a, 64b, 64c. Each input module 63a, 63b, 63c processes the signal and sends an output to a two out of three voter 62 to generate a signal in dependence thereon. It will be appreciated that many variations and configurations are possible in addition to those illustrated here.

Figure 7:
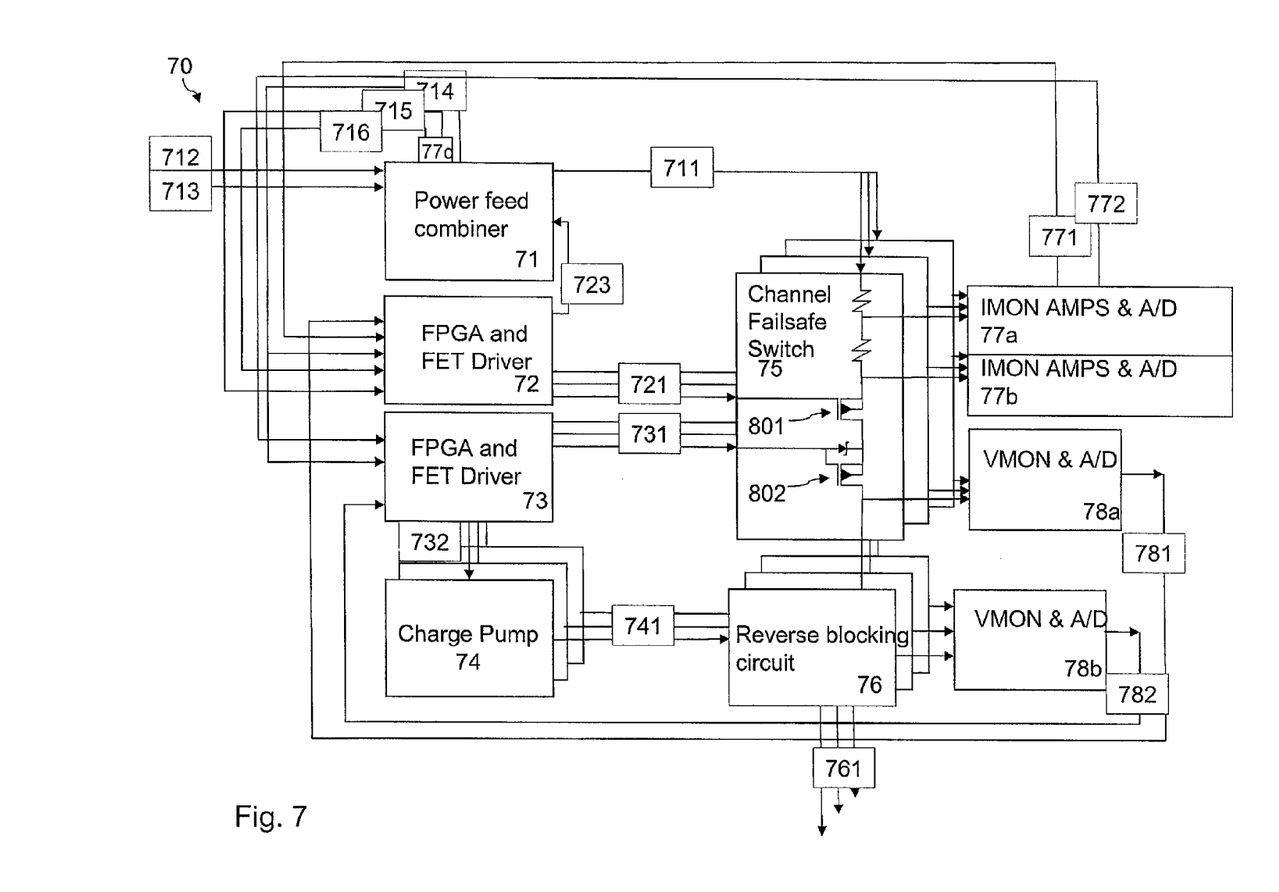
FIG. 7 illustrates an output module in accordance with the present invention.

FIG. 7 illustrates schematically an output module in accordance with the present invention.

An output module 70 comprises a power feed combiner 71, a first field programmable gate array (FPGA) and field effect transistor (FET) driver 72, a second FPGA and FET driver 73. The drivers 72, 73 control a plurality of channels each channel driving a load (not shown) each channel comprising a channel failsafe switch 75 connected to a respective reverse blocking circuit 76 each of which is driven by a respective charge pump (only three channels are shown schematically for clarity).

It will be appreciated that the incorporation of the control logic into an FPGA is not central to the invention; it is just a convenient implementation. The logic could equally well be implemented in an application specific integrated circuit (ASIC), or a general purpose microcomputer without departing from the scope of the invention as defined in the appended claims.

The current and voltages at various points in the channel are monitored by two arrays of current amplifiers and monitors and A/D converters 77a, 77b and two arrays of voltage monitors and A/D converters 78a and 78b. In a preferred embodiment of the invention there are eight output channels served by eight channel failsafe switches 75 and associated reverse blocking circuits 76.

The first FPGA and FET driver 72 generates a plurality of signals 721 each of which drives a first FET 801 in each switch 75. The second FPGA and FET driver 73 generates a plurality of signals 731 each of which drives a second FET 802 in each switch 75.

Each voltage monitor signal 781, and each current monitor signal 771 is fed back into the first FPGA and FET driver 72, each voltage monitor signal 782 and each current monitor signal 772 is fed back to the second FPGA and FET driver 73 where various functions are carried out in dependence thereon.

One such function is generation of charge pump drive signals 732 which are used to control a charge pump 74 associated with each channel as will be described later with reference to FIG. 9.

The first FPGA and FET driver 72 generates a pair of power feed combiner drive signals 723. The power feed combiner drive signals 723 are used by the power feed combiner 71 to enable generation of a combined field power signal 711, from two independent field supply voltages 712, 713, to the plurality of channel failsafe switches 75.

The power feed combiner 71 allows the two independent field supply voltages 712, 713 to be applied to a plurality of channel failsafe switches 75 with low power losses. The combined power feed currents are continuously monitored by respective FPGA and FET drivers 72, 73 via a current amplifier and A/D arrays as will be described below.

The FPGA and FET drivers 72, 73 each comprise a programmable FPGA as well as a driver for an array of FETs. The FPGA carries out the logical functions required and the FET drivers are simply an analogue signal processing element.

In the event that a reverse current is detected flowing out of the power feed input. The FPGA and FET driver can react very quickly using dedicated logic to cause the input power feeds to be disabled using the power feed combiner drive signal 723.

The power feed combiner also provides an over-temperature signal 714 that is sent to the FPGAs in both in FPGA and FET drivers 72, 73 to provide for a shutdown of the module outputs 761 in the event that the power feed combiner 71 experiences a fault that results in high heat dissipation. The temperature sensor signal 714 uses a 2 wire digital communications scheme known as $I^2C$ (I squared C). The signal is routed to both FPGA's so that they may both shut down the output FETs 801, 802 in each switch 75.

It will be appreciated that the use of the specified temperature sensor is not critical to the inventive concept embodied and that other types of temperature sensor, for example a thermistor would provide the required functionality equally well.

Figure 8:
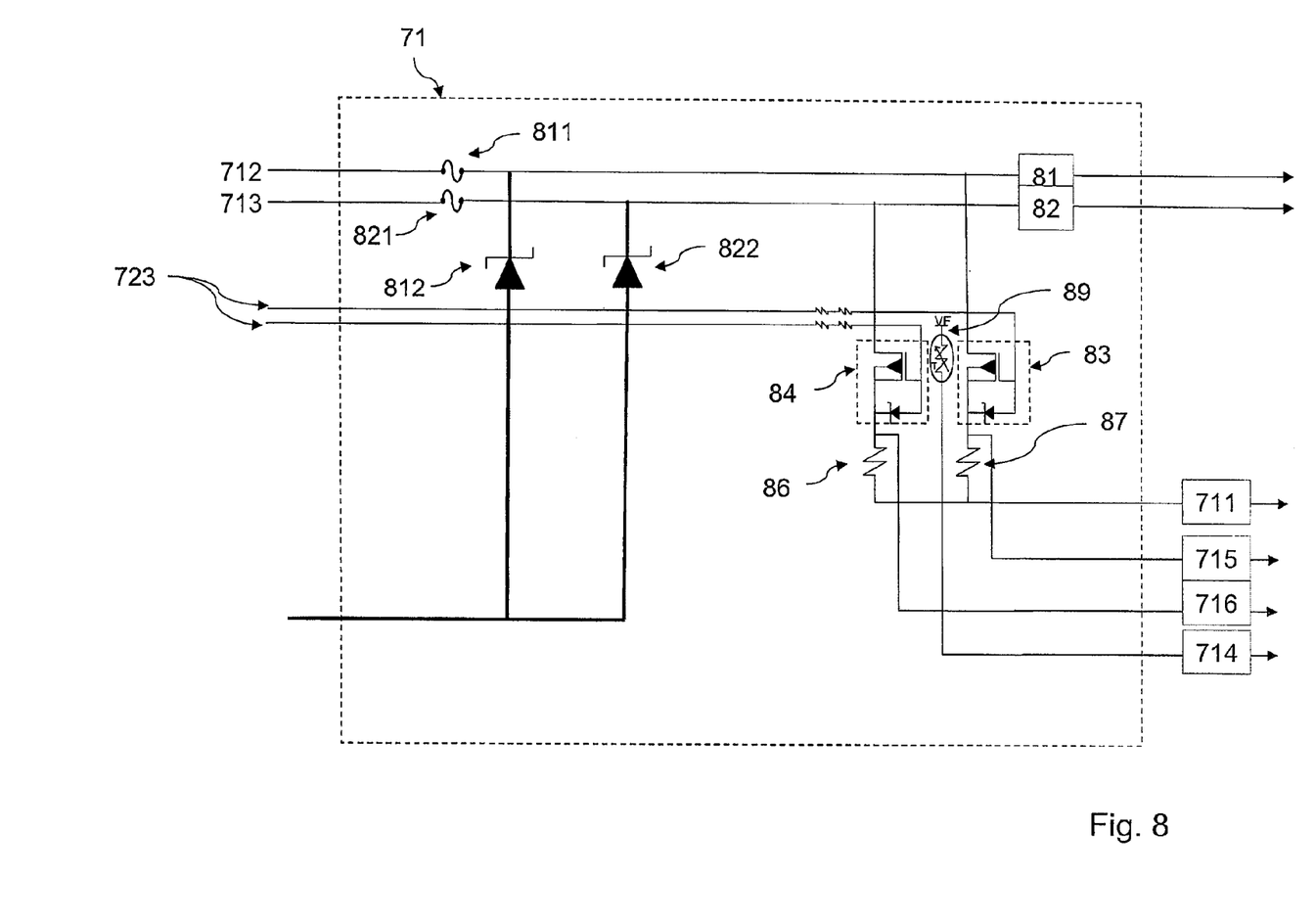
FIG. 8 illustrates a power feed combiner in accordance with a preferred embodiment of the present invention.

The power feed combiner 71 will now be described in more detail with reference to FIG. 8.

The power feed combiner 71 comprises two input voltage rails 81, 82, each being protected by a respective overload protection fuse 811, 821. The combiner 71 is protected from transient voltage surges by respective diodes 812, 822. The input voltage rail 81 receives a first field voltage 712 and the input voltage rail 82 receives a second field voltage 713.

Rail 81 feeds a first high current P channel metal oxide semiconductor field effect transistor (MOSFET) 83 which is controlled by one of the pair of signals 723 from the first FPGA and FET driver 72. Rail 82 feeds a second high current P channel MOSFET 84 which is controlled by the other one of the pair of signals 723 from the first FPGA and FET driver 72.

When both transistors 83, 84 are enabled by signals 723 a combined field voltage 711 is generated.

First sense resistor 86 and second sense resistor 87 allow current through the transistors to be monitored. Output 715 from the second sense resistor 87 and output 716 from the first sense resistor 86 are sent to the first FPGA and FET driver 73 via current monitor amplifiers and A/D converters 77c.

In a preferred embodiment of the invention current monitor amplifiers and A/D converters 77c may be in the same physical array as current amplifiers and A/D converters 77a or 77b.

In the event that the controlling FPGA in FPGA and FET driver 72 detects current flowing out of one of the power feed inputs 712, 713 then the corresponding transistor 83, 84 is turned off using one of control signals 723 to break the connection to the external power feed.

The power feed combiner 71 also comprises a temperature sensor 89 which detects a rise in temperature which may be caused by either or both transistors 83, 84 have failed such that their body diodes continue to pass current, but their channel is not shunting the current. This type of failure mode could result in high circuit board temperatures, and a temperature sensor signal 714 is sent to FPGA and FET drivers 73, 74 and allows the FPGA controllers to turn off both transistors 801, 802 in the output channels to mitigate a potential overheat hazard condition.

The power feed combiner 71 is testable by the controller periodically turning off one of the FETs 83, 84 and observing an increase in voltage across the FET, as well as a decrease in current through it.

As mentioned previously the output channel current is continuously monitored and the charge pump signal 732 is generated in dependence upon the monitored current. In the event that current is detected flowing into the channel failsafe switch 75 the charge pump signal can be disabled very quickly by dedicated logic in the FPGA as will now be described with reference to FIG. 9.

Figure 9:
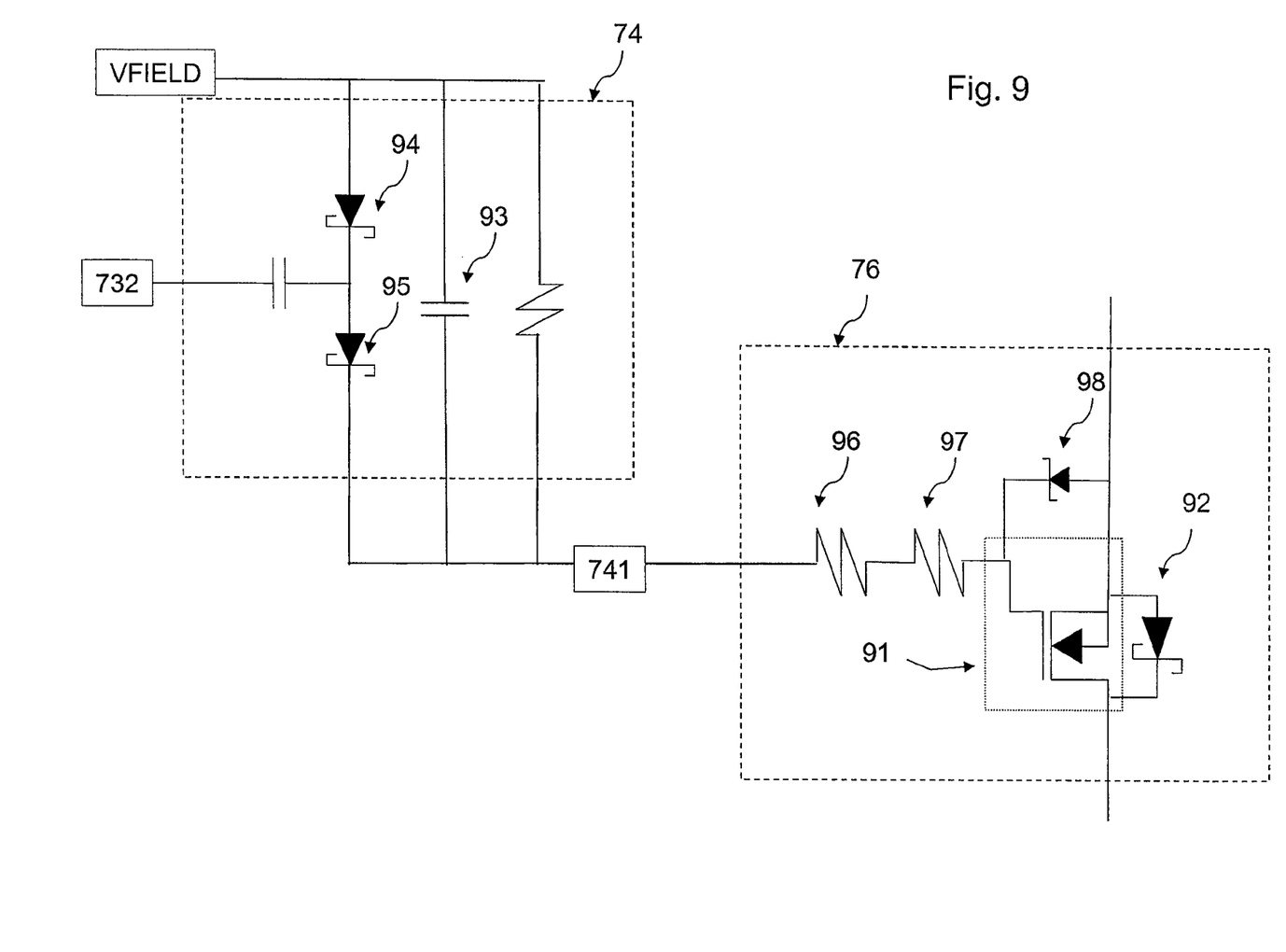
FIG. 9 illustrates a conventional charge pump, and a reverse blocking circuit in accordance with the present invention.

As shown in FIG. 9, the reverse blocking circuit 76 comprises a reverse blocking transistor 91 which is a high current N channel MOSFET. The reverse blocking transistor 91 is driven using a charge pump signal 732 generated by a control circuit resident in the FPGA and FET driver 73. The current through the transistor 91 and the voltage across it is monitored and sent to the FPGA and FET driver 73 via A/D converter channels and amplifiers 77*b*, 78*b*.

When reverse current is detected flowing into the digital outputs, then the reverse blocking transistor 91 is turned off, to break the connection to the external power source.

The use of a low voltage charge pump 74 to generate the positive turn-on bias voltage required by the reverse blocking transistor simplifies the power supply requirements for the output module.

FIG. 9 illustrates a simple low voltage implementation of a conventional charge pump (sometimes referred to as a diode-capacitor voltage multiplier). Each transition of the charge pump signal 732 transfers some charge from a square wave driver into an output capacitor 93 as constrained by switching diodes 94, 95.

The reverse blocking transistor 91 is also turned off when channel diagnostic tests are to be run on the channel failsafe switch 75. The reverse blocking transistor 91 itself may also be tested periodically for an on channel by turning it off and examining the change in channel voltage. Two high resistance resistors 96, 97 in series with the gate together with a zener diode 98 from gate to source allow the reverse blocking transistor 91 to be pulled down to 0V when the channel is in the off state.

A backup diode 92, consisting of a low forward drop Schottky power diode is included in the circuit to allow operation if the reverse blocking transistor 91 fails or there is a failure in the charge pump path driving the gate. If only one or a small number of channels are in this faulted condition then the temperature increase mentioned earlier can be tolerated.

It will be appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention as defined in the appended claims.

The invention claimed is:

1. A reverse blocking circuit for blocking reverse current comprising:
 a first transistor driven by a first control signal and arranged to receive a positive turn-on bias voltage;
 a first current monitor arranged to monitor a first current through the first transistor; and
 a processor arranged to receive the first monitored current, generate the first control signal in dependence upon said first monitored current, and to turn off the first transistor in the event that a reverse current is detected in the first transistor.

2. The reverse blocking circuit of claim 1 further comprising a low voltage charge pump that generates the positive turn-on bias voltage applied to the first transistor.

3. The reverse blocking circuit of claim 2 wherein the low voltage charge pump includes an output capacitor and a pair of switching diodes that are arranged so that a portion of a charge pump signal is maintained by the output capacitor.

4. The reverse blocking circuit of claim 1 further comprising a diode oriented to allow operation of the processor during failure of the first transistor without detection of reverse current.

5. The reverse blocking circuit of claim 1 connected to a power feed combiner configured to receive independent field supply voltages and output the first current.

6. The reverse blocking circuit of claim 5 further comprising a temperature sensor connected to the power feed combiner and configured to terminate communication of power during an overheat condition independent of the direction of current through first transistor.

7. A power feed combiner comprising:
 a first transistor driven by a first control signal;
 a first current monitor arranged to monitor a first current through the first transistor;
 a second transistor driven by a second control signal;
 a second current monitor arranged to monitor a second current through the second transistor, the first transistor oriented to receive a first field voltage and the second transistor oriented to receive a second field voltage, an output of the first and second transistors being connected to provide a combined field voltage when both the first transistor and the second transistor are turned on;
 a processor arranged to:
  receive the first monitored current;
  receive the second monitored current;
  generate the first control signal in dependence upon said first monitored current;
  generate the second control signal in dependence on said second monitored current;
  turn off the first transistor in the event that a reverse current is detected in the first transistor; and
  turn off the second transistor in the event that a reverse current is detected in the second transistor; and
 a diode oriented to allow operation of the processor during failure of at least one of the first or second transistor without detection of an associated reverse current.

8. The power feed combiner of claim 7 further comprising a low voltage charge pump that generates a positive turn-on bias voltage applied to at least one of the first and second transistor.

9. The power feed combiner of claim 8 wherein the low voltage charge pump includes an output capacitor and a pair of switching diodes that are arranged so that a portion of a charge pump signal is maintained by the output capacitor.

10. The power feed combiner of claim 7 further comprising a temperature sensor configured to terminate communication of power during an overheat condition independent of the direction of current through either of the first or second transistor.

11. A method of preventing a reverse current flow condition in an output module for an Industrial Process Control System comprising:
  driving a first transistor with a first control signal;
  monitoring a current through the first transistor;
  directing the monitored current to a processor that generates the first control signal as a function of the monitored current and turns off the first transistor if a reverse current is detected in the first transistor;
  generating a positive turn-on bias voltage with a low voltage charge pump having an output capacitor and a pair of switching diodes arranged so that a portion of a charge pump signal is maintained by the output capacitor; and
  applying the positive turn-on bias voltage to the first transistor.

12. The method of claim 11 further comprising driving a second transistor with a second control signal.

13. The method of claim 12 further comprising generating the second control signal with the processor.

14. The method of claim 13 further comprising monitoring current through the second transistor and suspending the second control signal if the monitored current is in an opposite direction relative to the second control signal.

15. The method of claim 13 further comprising providing a first field voltage to the first transistor and providing a second field voltage to the second transistor and combining outputs of the first and second transistors.

16. The method of claim 11 further comprising monitoring a temperature of the module and generating an over-temperature signal capable of suspending operation of the output module independent of the detected current.

17. A reverse blocking circuit for blocking reverse current comprising:
  a first transistor driven by a first control signal;
  a first current monitor arranged to monitor a first current through the first transistor;
  a processor arranged to receive the first monitored current, generate the first control signal in dependence upon said first monitored current, and to turn off the first transistor in the event that a reverse current is detected in the first transistor; and
  a diode oriented to allow operation of the processor during failure of the first transistor without detection of reverse current.

* * * * *